US009085442B2

(12) United States Patent
Willim

(10) Patent No.: US 9,085,442 B2
(45) Date of Patent: Jul. 21, 2015

(54) ROTARY JOINT

(75) Inventor: Hans-Dieter Willim, Ulm-Unterweiler (DE)

(73) Assignee: Liebherr-Werk Ehingen GmbH, Ehingen (DE)

( * ) Notice: Subject to any disclaimer, the term of this patent is extended or adjusted under 35 U.S.C. 154(b) by 443 days.

(21) Appl. No.: 12/630,588

(22) Filed: Dec. 3, 2009

(65) Prior Publication Data

US 2010/0155355 A1 Jun. 24, 2010

(30) Foreign Application Priority Data

Dec. 19, 2008 (DE) .................... 20 2008 016 876 U

(51) Int. Cl.
| B66C 23/86 | (2006.01) |
| B66C 23/70 | (2006.01) |
| F16C 19/38 | (2006.01) |
| B66C 23/26 | (2006.01) |

(52) U.S. Cl.
CPC ............. *B66C 23/705* (2013.01); *B66C 23/708* (2013.01); *B66C 23/86* (2013.01); *F16C 19/381* (2013.01); *B66C 23/26* (2013.01)

(58) Field of Classification Search
CPC ...... B66C 23/26; B66C 23/36; B66C 23/365; B66C 2700/035; B66C 2700/0371; B66C 2700/067
USPC ............... 212/175, 179–181, 253; 74/490.05; 384/542, 585, 620, 452–455, 590–593; 296/190.05; 180/89.13; 403/78, 164, 403/165
See application file for complete search history.

(56) References Cited

U.S. PATENT DOCUMENTS

| 3,810,551 | A | * | 5/1974 | Bust et al. ...................... 212/346 |
| 4,248,488 | A | * | 2/1981 | Sable ............................ 384/593 |
| 4,609,323 | A | * | 9/1986 | Blaseck et al. ................ 414/663 |
| 4,621,742 | A | * | 11/1986 | Rathi ............................ 212/177 |
| 4,622,860 | A | | 11/1986 | Cametti et al. |
| 5,082,128 | A | * | 1/1992 | Franzen et al. ............... 212/347 |
| 2004/0244521 | A1 | * | 12/2004 | Russ et al. ...................... 74/425 |

FOREIGN PATENT DOCUMENTS

| DE | 3723961 A1 | 2/1989 |
| DE | 19607683 A1 | 12/1996 |
| DE | 10039573 C1 | 1/2002 |
| DE | 10112293 C1 | 7/2002 |
| DE | 20 2006 019 192 | 6/2008 |
| EP | 0945393 A2 | 9/1999 |
| JP | 9-132383 A * | 5/1997 |

(Continued)

OTHER PUBLICATIONS

ISA European Patent Office, Search Report of EP 09 01 2406, Jul. 6, 2010, Germany, 8 pages.

(Continued)

*Primary Examiner* — Sang Kim
*Assistant Examiner* — Juan Campos, Jr.
(74) *Attorney, Agent, or Firm* — Alleman Hall McCoy Russell & Tuttle LLP

(57) ABSTRACT

The present disclosure relates to a rotary joint for rotatable connection of the uppercarriage with the undercarriage of a crane, wherein they can each be connected with the uppercarriage on the one hand and the undercarriage on the other hand via a quick-release coupling.

15 Claims, 4 Drawing Sheets

(56) References Cited

FOREIGN PATENT DOCUMENTS

JP   09132383 A      5/1997
JP   10-109889 A  *  4/1998

OTHER PUBLICATIONS

ISA German Patent and Trademark Office, Search Report of 20 2008 016 876.7, Jun. 29, 2009, Germany, 4 pages.

* cited by examiner

ROTARY JOINT

CROSS REFERENCE TO RELATED APPLICATION

This application claims priority to German Utility Model Application No. 20 2008 016 876.7, filed Dec. 19, 2008, which is hereby incorporated by reference in its entirety for all purposes.

TECHNICAL FIELD

The present disclosure relates to a rotary joint for rotatable connection of the uppercarriage with the undercarriage of a crane.

BACKGROUND AND SUMMARY

Large cranes, such as in particular crawler cranes, are dismantled into individual parts for transport. Accordingly, the crane is disassembled for transport. There are obtained various transport units, which possibly can be moved in road traffic by using special transport vehicles. The regulations applicable for transport relate for instance to the weight or also to the dimensions.

Depending on weight and dimension, the crane thus is dismantled into a plurality of parts, for instance into the uppercarriage and various parts of the undercarriage, and into the respective equipment parts. If a crane must now be transported, in which for instance both the uppercarriage and the middle part of the frame of the undercarriage reach the maximum weights admissible in road traffic, it becomes necessary to separately transport the rotary joint arranged between the uppercarriage and the middle part of the frame of the undercarriage with the associated drives.

The object of the present disclosure now consists in providing a rotary joint of the generic type for a crane, in particular a crawler crane, which quickly, easily and reliably can be connected both with the undercarriage and with the uppercarriage of the crane and can again be released from the same, in order to be able to be transported separately.

In accordance with the present disclosure, this object is solved by a rotary joint for rotatable connection of the uppercarriage with the undercarriage of a crane, wherein the rotary joint can be connected with the uppercarriage on the one hand and the undercarriage on the other hand via a quick-release coupling. Accordingly a rotary joint is provided for rotatable connection of the uppercarriage with the undercarriage of a crane, wherein this rotary joint can each be connected with the uppercarriage on the one hand and the undercarriage on the other hand via a quick-release coupling, in accordance with the present disclosure.

Due to this separability of the rotary joint both from the uppercarriage and from the undercarriage in accordance with the present disclosure, a good transportability and in particular a reduction of the transport weights of the individual components of the large crane can be achieved. In addition, the individual assemblies of the crane can optimally be configured, in order to achieve very high lifting capacities of the crane. Via the quick-release coupling, safe and fast assembly or disassembly of the rotary joint is possible.

Accordingly, the rotary joint preferably constitutes a roller rotary joint. Such roller rotary joints can absorb very high lifting capacities.

The drive advantageously is formed of a plurality of hydraulic drive units, which according to a particularly advantageous aspect of the present disclosure are connected with each other such that only the entirety of the drives must be connected with the hydraulic lines of the uppercarriage. This reduces the assembly time, since it is not necessary to connect each individual drive with hydraulic lines of the uppercarriage.

Advantageously, the rotary joint constitutes a circular slewing ring. For coupling the undercarriage and/or for coupling the uppercarriage, two circular opposed webs each can be provided here, in which bolts uniformly distributed around the periphery can pluggably be received, in order to provide a bolt connection with a mounting flange of the undercarriage or the uppercarriage, which can be received between the webs. The quick-release coupling is formed thereby.

Particularly advantageously, the inserted bolts each can be lockable via a bolt locking device, which contributes to the operational safety of the crane. Further details and advantages of the present disclosure will be explained in detail with reference to an embodiment illustrated in the drawing, which are drawn approximately to scale.

DETAILED DESCRIPTION

Figure 1:
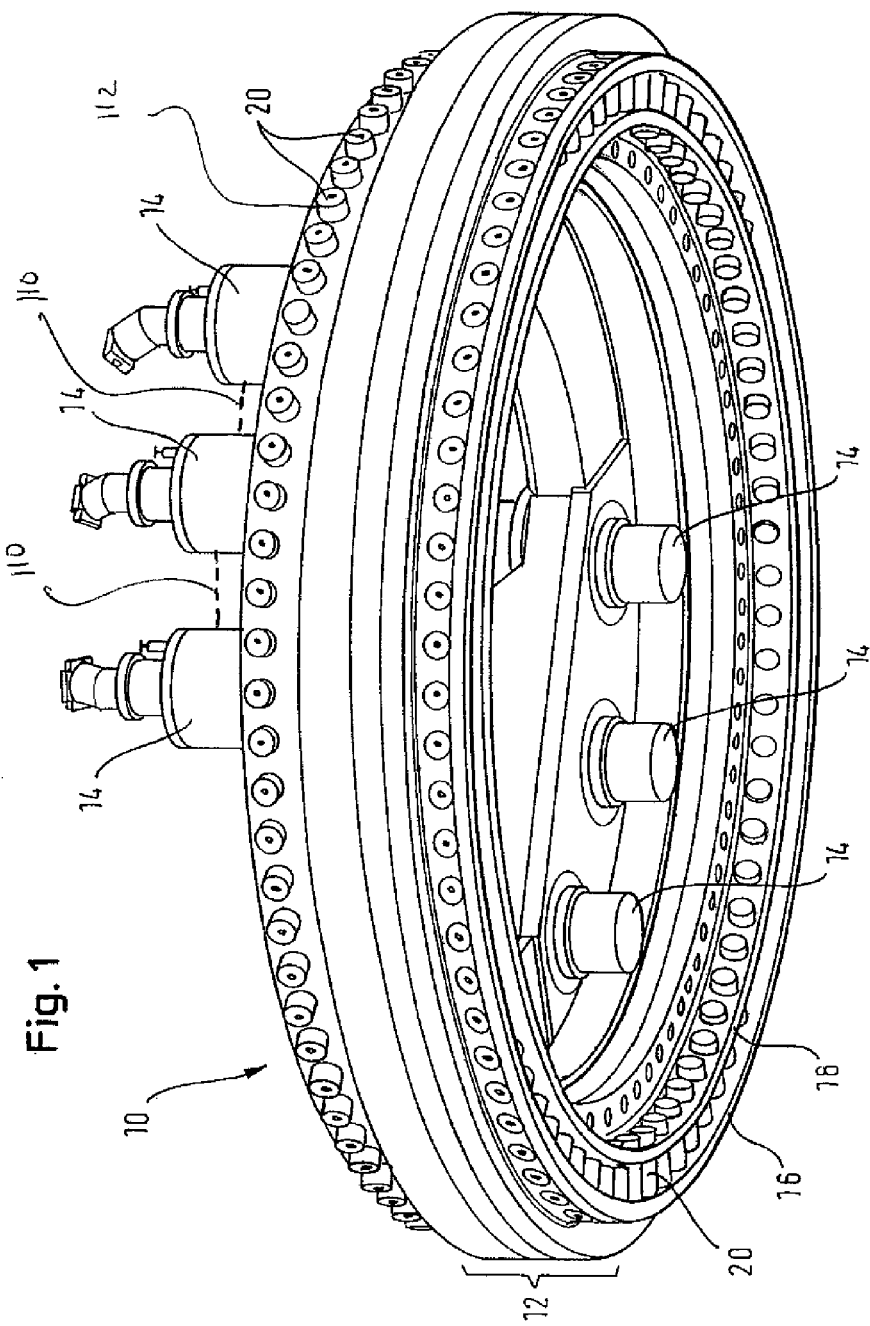
FIG. 1 shows a perspective representation of a rotary joint in accordance with the present disclosure.
Figure 2:
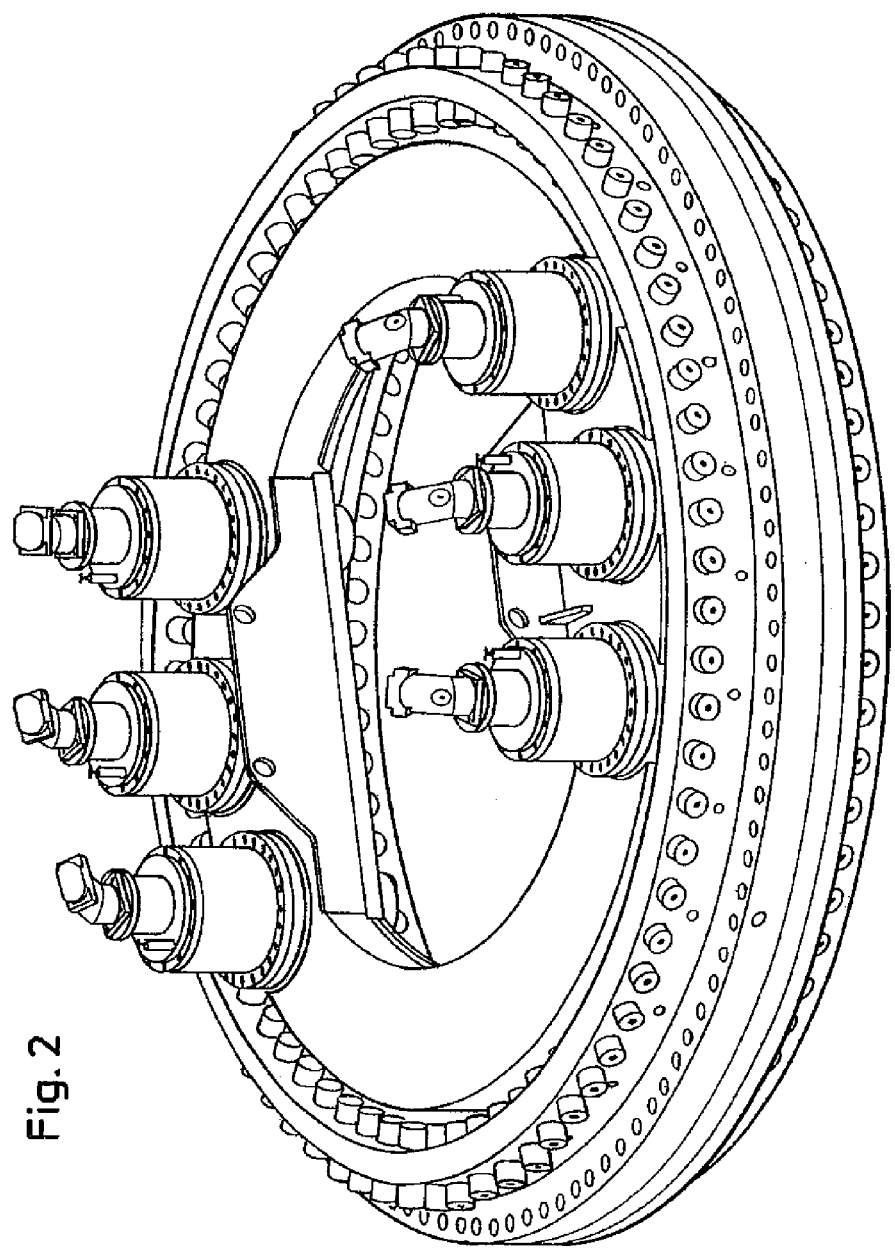
FIG. 2 shows a perspective representation of the rotary joint of FIG. 1 from another viewing angle.

As shown in FIGS. 1 and 2, the rotary joint 10 consists of a circular roller slewing ring. In a manner not shown here, a non-illustrated uppercarriage can be connected with a non-illustrated undercarriage via the rotary joint 10. Central part of the rotary joint 10 is the roller rotary joint 12, which is configured in a conventional way and therefore need not be described further. The roller rotary joint includes six drives 14, which generate the required torques or driving torques. These are hydraulic drives, which in a manner not illustrated here in greater detail are connected with each other via hydraulic lines 110, so that they can be connected with the likewise non-illustrated hydraulic lines of the uppercarriage as an entire unit, for example, by a single hydraulic connection.

On one side, the roller rotary joint 12 is adjoined by two circular opposed webs 16 and 18, which extend in parallel offset with respect to each other. As can be taken from FIGS. 1 and 2, a large number of bolts 20 uniformly distributed around the periphery are inserted in the webs, which each can be retracted via bolt drawing means 112, which may be a mechanical lever or other such structure to retract or engage one or more of bolts 20. For assembly with the undercarriage, the rotary joint 10 is placed on the mounting flange of the undercarriage, wherein the mounting flange is positioned between the webs 16 and 18 (in a manner not shown here). Subsequently, the bolts are inserted, wherein the same do not only extend through the walls 16 and 18, but also through the non-illustrated mounting flange, which includes corresponding bores. This provides for a safe assembly of the rotary joint with the undercarriage or the uppercarriage of the crane not shown here in greater detail.

Figure 3:
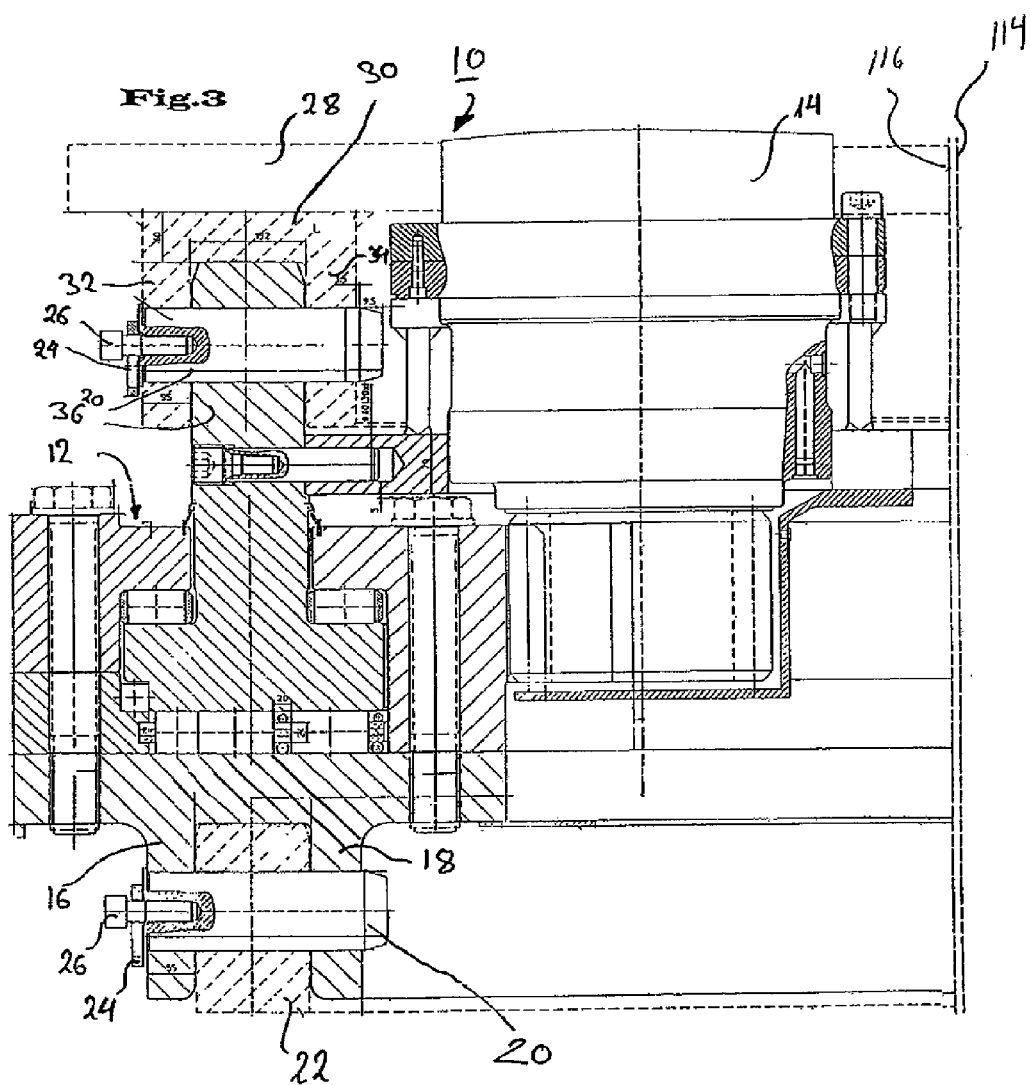
FIG. 3 shows a sectional representation through part of the rotary joint of FIGS. 1 and 2.

The connection with a mounting flange 22 of a non-illustrated undercarriage can be taken from the sectional representation of FIG. 3 showing the axis of rotation at 114. While FIG. 3 is drawn approximately to scale, line 116 represents a break where the scale is not maintained from line 116 to the central axis 114. Here, a bolt 20 is inserted through the webs 16 and 18 of the rotary joint 10 and at the same time through a corresponding bore of the flange 22 of the undercarriage. The bolt is locked via a bolt locking device 24, wherein this bolt locking device 24 is connected with the bolt via a screw 26.

The section shown in FIG. 3 also reveals the structure of the roller rotary joint 12 known as such, which is conventional, however, and will therefore not again be described in detail at this point.

In the embodiment shown in FIG. 3, the connection of the non-illustrated uppercarriage with its slewing platform 28 shown here only schematically is effected in that the mounting flange 30 of the uppercarriage forks into two lateral webs 32 and 34 extending circularly and parallel to each other, which as shown in FIG. 3 enclose a likewise circular mounting web 36 of the rotary joint. Via the correspondingly inserted bolts 20, which in turn are locked via the locking device 24, 26, the webs 32 and 34 are fixed with respect to the ring 36.

Figure 4:
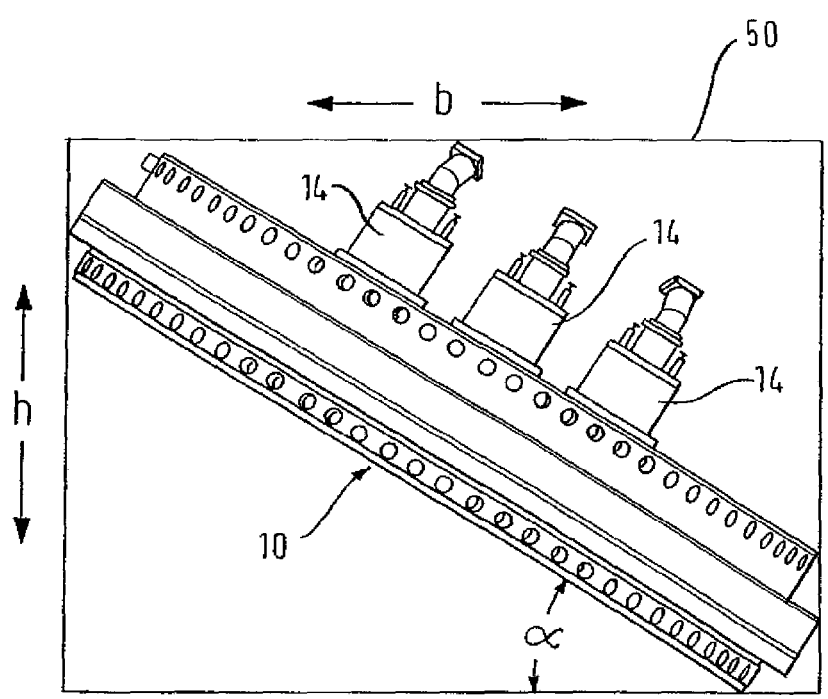
FIG. 4 shows the rotary joint of the preceding Figures packed into a transport container.

In FIG. 4, the rotary joint is shown in the transport condition. The rotary joint can be loaded as an entire unit, i.e. with the mounted drives 14. In one embodiment, this unit altogether has a weight of about 32 t and therefore is not suitable for road transport. The external dimensions also are designed for road transport. Thus, the entire unit 10 is accommodated on a special bracket not shown here in greater detail, so that it can be transported on the transport means, for instance the low-bed truck, erected by a defined angle α. This position allows a maximum utilization of the admissible limitations, such as the height h and the width b, which are specified in road traffic.

The invention claimed is:

1. An article of manufacture, comprising:
a rotary joint for rotatable connection of an uppercarriage with an undercarriage of a crane, the rotary joint including first and second couplings, each coupling comprising circular opposed webs in which a plurality of retractable bolts are pluggably received and uniformly distributed around a periphery of the rotary joint in order to provide a multitude of bolt connections with a mounting flange; and
a plurality of hydraulic drive units mounted on the rotary joint which generate driving torques for driving the rotary joint;
wherein the mounted hydraulic drive units are directly connected with each other via hydraulic lines;
wherein the mounted hydraulic drive units are directly connectable with hydraulic lines of the uppercarriage, as an entire unit, by a single hydraulic connection;
wherein the rotary joint is connectable with the uppercarriage via the first coupling and the undercarriage via the second coupling;
wherein, in a transport condition, the rotary joint is configured to be released as an entire unit from the uppercarriage and undercarriage and loaded for separate transport with the mounted hydraulic drive units as an entire unit.

2. The article according to claim 1, wherein the rotary joint is a roller rotary joint.

3. The article according to claim 1, wherein in the transport condition, the rotary joint with the mounted hydraulic drive units is loaded at a defined angle on a transport means.

4. The article according to claim 3, wherein the plurality of retractable bolts is greater than a number of hydraulic drive units in the plurality of hydraulic drive units.

5. The article according to claim 1, wherein the drive units are hydraulically connected with each other on the rotary joint.

6. The article according to claim 1, wherein the rotary joint is a circular slewing ring, and wherein each coupling comprises two circular opposed webs.

7. The article according to claim 6, wherein the bolts received around the periphery of the rotary joint each can be locked via a bolt locking device.

8. The article according to claim 1, wherein in the transport condition, the rotary joint with the mounted hydraulic drive units is loaded at a defined angle on a transport means.

9. The article according to claim 1, wherein a first portion of the rotary joint is connectable with the uppercarriage via the first coupling and a second portion, opposite the first portion, of the rotary joint is connectable with the undercarriage via the second coupling, and wherein each coupling comprises two circular opposed webs.

10. An article of manufacture, comprising:
a rotary joint for rotatable connection of an uppercarriage with an undercarriage of a crane, the rotary joint including a first end shaped to be releasably coupled with the uppercarriage via a first plurality of retractable bolts, the first plurality of retractable bolts comprising a plurality of retractable bolts uniformly distributed around a first periphery of the first end, the rotary joint further including a second end shaped to be releasably coupled with the undercarriage via a second plurality of retractable bolts, the second plurality of retractable bolts comprising a plurality of retractable bolts uniformly distributed around a second periphery of the second end, the second end positioned opposite the first end;
wherein the first end includes circular opposed webs, in which the first plurality of bolts are pluggably received around the first periphery;
wherein the second end includes circular opposed webs, in which the second plurality of bolts are pluggably received around the second periphery;
wherein a plurality of hydraulic drive units mounted on the rotary joint generate driving torques for driving the rotary joint,
wherein the mounted hydraulic drive units are directly hydraulically connected with each other on the rotary joint via hydraulic lines,
wherein the mounted hydraulic drive units are directly connectable with hydraulic lines of the uppercarriage, as an entire unit, by a single hydraulic connection, and
wherein, in a transport condition, the rotary joint is configured to be released as an entire unit from the uppercarriage and undercarriage and loaded for separate transport with the mounted hydraulic drive units as an entire unit.

11. The article according to claim 10, wherein the rotary joint is a roller rotary joint, wherein the first end includes two circular opposed webs, and wherein the second end includes two circular opposed webs.

12. The article according to claim 11, wherein the first end is releasably couplable with a mounting flange of the uppercarriage via the first plurality of retractable bolts, wherein the second end is releasably couplable with a mounting flange of the undercarriage via the second plurality of retractable bolts, wherein the mounting flange of the uppercarriage forks into the two circular opposed webs of the first end and encloses a mounting web of the first end, and wherein the mounting flange of the undercarriage is positioned between the two circular opposed webs of the second end.

13. The article according to claim 10, wherein in the transport condition, the rotary joint with the mounted hydraulic drive units is loaded at a defined angle on a transport means.

14. The article according to claim 10, wherein the rotary joint is a circular slewing ring.

15. The article according to claim 10, wherein the first and second ends rotate with respect to one another around a common central axis.

* * * * *